(12) United States Patent
Wlassics et al.

(10) Patent No.: US 6,265,494 B1
(45) Date of Patent: *Jul. 24, 2001

(54) CURABLE FLUOROELASTOMERIC COMPOSITIONS

(75) Inventors: Ivan Wlassics, Rapallo; Alberto Zompatori, Bologna; Anna Staccione, Milan, all of (IT)

(73) Assignee: Ausimonto S.p.A., Milan (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 11 days.

(21) Appl. No.: 09/080,954

(22) Filed: May 19, 1998

(30) Foreign Application Priority Data

May 20, 1997 (IT) .............................. MI97A1168

(51) Int. Cl.$^7$ ........................................ C08F 8/00
(52) U.S. Cl. ............................ 525/326.3; 525/326.2; 525/140; 525/102; 525/340; 568/615
(58) Field of Search .................... 525/326.2, 340, 525/102, 326.3; 568/615

(56) References Cited

U.S. PATENT DOCUMENTS

| | | |
|---|---|---|
| 3,242,218 | 3/1966 | Miller . |
| 3,291,843 | 12/1966 | Fritz et al. . |
| 3,655,727 | 4/1972 | Patel et al. . |
| 3,665,041 | 5/1972 | Sianesi et al. . |
| 3,686,143 | 8/1972 | Bowman . |
| 3,712,877 | 1/1973 | Patel et al. . |
| 3,715,378 | 2/1973 | Sianesi et al. . |
| 3,810,874 | 5/1974 | Mitsch et al. . |
| 3,857,807 | 12/1974 | Kometani et al. . |
| 3,876,654 | 4/1975 | Pattison . |
| 3,920,620 * | 11/1975 | Ceccato et al. ................ 525/326.3 |
| 3,933,732 | 1/1976 | Schmiegel . |
| 4,233,421 | 11/1980 | Worm . |
| 4,259,463 | 3/1981 | Moggi et al. . |
| 4,287,320 | 9/1981 | Kolb . |
| 4,523,039 | 6/1985 | Lagow et al. . |
| 4,789,717 | 12/1988 | Giannetti et al. . |
| 5,144,092 | 9/1992 | Marraccini et al. . |
| 5,218,026 * | 6/1993 | Toda et al. ..................... 525/255 |
| 5,281,506 * | 1/1994 | Badesha et al. ................ 430/124 |
| 5,409,998 * | 4/1995 | Chiodini et al. ................ 525/375 |
| 5,480,930 * | 1/1996 | Gentle et al. ................... 524/414 |
| 5,483,000 * | 1/1996 | Kaneko et al. ................. 525/102 |
| 5,648,430 * | 7/1997 | Chiodini et al. ................ 525/415 |
| 5,654,375 * | 8/1997 | Jing et al. ...................... 525/326.3 |
| 5,736,250 * | 4/1998 | Heeks et al. ................... 428/447 |
| 5,830,381 * | 11/1998 | Chiodini et al. ............... 252/182.14 |
| 5,883,197 * | 3/1999 | Barbieri et al. ................ 525/340 |

FOREIGN PATENT DOCUMENTS

| | | |
|---|---|---|
| 0 120 462 A1 | 3/1984 | (EP) . |
| 0 148 482 A2 | 7/1985 | (EP) . |
| 0 182 299 A2 | 5/1986 | (EP) . |
| 0 196 904 A2 | 10/1986 | (EP) . |
| 0 250 767 A1 | 1/1988 | (EP) . |
| 0 280 312 A2 | 8/1988 | (EP) . |
| 0 684 272 A1 | 11/1995 | (EP) . |
| 0 684 276 A1 | 11/1995 | (EP) . |
| 1 104 482 | 2/1968 | (GB) . |

OTHER PUBLICATIONS

Derwent Abstract; AN:95009668: JP6293850.
Derwent Abstract; AN123:115020; JP 93—310309.
Kirk–Othmer; Encyclopedia of Chemical Technology; Third Edition; vol. 8; PP. 500 E SEG., 1979; Diuretics to Emulsions; Cited at P. 15 of the Specification.

* cited by examiner

Primary Examiner—Donald R. Wilson
Assistant Examiner—Tanya Zalukaeva
(74) Attorney, Agent, or Firm—Arent Fox Kintner Plotkin Kahn PLLC

(57) ABSTRACT

Curable fluoroelastomeric compositions comprising:

A) 100 phr (parts) of fluoroelastomeric copolymers based on vinylidenefluoride (VDF) copolymers and at least a partially or completely fluorinated comonomer having an ethylene unsaturation;

B) 0.5 to 10 phr of a curing agent having the general formula $$[(R_3-Si)_m-(C_yM_{2y}-O-C_zM_{2z})_p-(C_tM_{2t-1})_n-P_q-O-]_2Q$$

wherein m, q are independently 0 or 1; p=0, 1, 2 or 3; n=0, 1 or 2; y, z are each from 1 to 20; t is from 3 to 10; R is selected from the group consisting of a $C_xM_{2x+1}$ linear or branched aliphatic chain containing hydrogen and/or fluorine (M=H and/or F), a $C_xM_{2x-1}$ cycloaliphatic structure containing hydrogen and/or fluorine, a $C_xM_{x-1}$ aromatic structure containing hydrogen or fluorine (wherein x in the formulas is an integer from 1 to 20) and $P_a$ wherein P is a bivalent (per)fluoropolyether linking group and a is an integer from 0 to 1; Q is selected from the group consisting of an aromatic or an aliphatic structure, an aromatic structure containing nitrogen or oxygen and a structure having the following formula $-S_1-C(S_2)-C(S_3)-Z-C(S_4)-C(S_5)-S_6-$ wherein $S_1, S_2, S_3, S_4, S_5$ and $S_6$ are equal to or different from each other, and are H or $C_1-C_5$ alkyls and Z is a $C_1-C_{18}$ alkylene or cycloalkylene radical, linear or branched, optionally containing oxygen and/or fluorine atoms, or a bivalent (per)fluoropolyoxyalkylene radical P; with the proviso that when p is different from 0, m=1 and n=q=0; when n is different from 0, m=p=q=0; and when q is different from 0, m=1 and p=n=0; and C) an accelerant being an onium-organic compound having a positive charge in an amount from 0.05 to 5 phr.

13 Claims, No Drawings

CURABLE FLUOROELASTOMERIC COMPOSITIONS

The invention relates to vinylidenefluoride copolymers with other comonomers deriving from fluorinated monomers having an ethylene unsaturation.

More in detail the present invention relates to fluoroelastomeric polymers based on vinylidenefluoride (VDF), hexafluoropropene (HFP), optionally in the presence of one or more ethylenically unsaturated comonomers, preferably tetrafluoroethylene (TFE).

More specifically the invention relates to VDF-based fluoroelastomeric copolymers suitable to the preparation of O-rings, fuel hoses, shaft seals, gaskets, etc.

It is known that for the preparation of these manufactured articles, fluoroelastomeric materials having very good elastic properties combined with an high thermochemical stability are required.

These properties must be combined with good mechanical properties and good processability either in compression or in injection or in extrusion moulding.

It is known to produce VDF, HFP and TFE-based manufactured articles, optionally in the presence of perfluoroalkylvinylethers (PAVE), by using the peroxidic curing. The drawback resides in that generally the obtained compression set are not high and the removal from the moulds is unsatisfactory.

It is known, see for instance EP 525,687, to carry out the ionic curing with accelerants and crosslinking agents. In this case to the polymer suitable crosslinking agents are added, see U.S. Pat. Nos. 4,259,463, 3,876,654, 4,233,421, which comprise aromatic and aliphatic polyhydroxylic compounds. The most common ones are the aromatic compounds including 4,4'-thiodiphenol isopropylene-bis(4-hydroxybenzene), bisphenol A and bisphenol AF, hexafluoroisopropylidene-bis(4-hydroxybenzene).

To the crosslinking agents accelerant systems are added, generally of the class of the phosphonium and amino phosphonium quaternary salts, as described in U.S. Pat. Nos. 3,876,654, 4,259,463. Other compounds behaving as accelerant systems are described in U.S. Pat. Nos. 3,655,727, 3,712,877, 3,857,807, 3,686,143, 3,933,732, 4,233,421 and in EP 335,705, EP 182,299, EP 120.462.

It is also known to add processing additives such as sulphones or sulphoxides to improve the blends processability.

It is moreover known that the fluoroelastomers show a poor processability due to the high viscosity of the compound.

These drawbacks are even more evident in the case of high fluorine content VDF copolymners (fluorine higher than about 67% by weight).

In the case of copolymers or terpolymers, indeed, with a high fluorine content, the crosslinking is still more difficult wherefore mechanical and elastic properties and processability of the manufactured article are poor.

It has been surprisingly and unexpectedly found that it is possible to prepare VDF-based fluoroelastomeric polymers having a very good combination of the following properties:
mechanical properties,
compression set,
low viscosity of the compound such as to allow an easy processing either in compression or in injection or in extrusion.

This became possible by using the ionic curing with a specific curing system.

An object of the present invention are curable fluoroelastomeric compositions comprising A) 100 phr (parts) of fluoroelastomeric copolymers based on vinylidenfluoride (VDF) and at least a partially or completely fluorinated comonomer having an ethylene unsaturation;

B) 0.5 to 10 phr, preferably 2 to 6, of a curing agent having the general formula

wherein m, y, z, p, t, n, q, are integers having the following values:

m, q, independently 0 or 1;

p=0, 1, 2, 3;

n=0, 1, 2;

y, z from 1 to 20, preferably from 1 to 10;

t from 3 to 10, preferably from 4 to 8;

R can be:
$C_xM_{2x+1}$ linear or branched aliphatic chain containing hydrogen and/or fluorine (M=H and/or F); or
$C_xM_{2x-1}$ cycloaliphatic structure containing hydrogen and/or fluorine; or
$C_xM_{x-1}$ aromatic structure containing hydrogen or fluorine;
x in said formulas is an integer from 1 to 20, preferably from 1 to 10; or
$P_a$ wherein P is a bivalent (per)fluoropolyether linking group, a is an integer from 0 to 1;

Q is an aromatic and aliphatic structure containing also fluorine, preferably bisphenol;

or an aromatic structure containing heteroatoms, preferably selected between nitrogen and oxygen;

or a structure having the following formula:

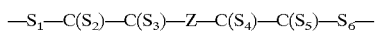

wherein
$S_1$, $S_2$, $S_3$, $S_4$, $S_5$, $S_6$, equal to or different from each other, are H or $C_1$–$C_5$ alkyls;

Z is a $C_1$–$C_{18}$ alkylene or cycloalkylene radical, linear or branched, optionally containing oxygen atoms, preferably at least partially fluorinated, or a bivalent (per)fluoropolyoxyalkylene radical P; Z is prefrably a $C_1$–$C_{12}$ perfluoroalkylene radical, while $S_1$, $S_2$, $S_3$, $S_4$, $S_5$, $S_6$ are preferably hydrogen;

with the proviso that when p is different from 0, m=1 and n=q=0;

when n is different from 0, m=p=q=0;

when q is different from 0, m=1 and p=n=0;

the preferred compounds are those wherein m=1 and p=n=q=0; and R is $C_xM_{2x+1}$ wherein x is an integer from 1 to 6; or q=m=1 and n=p=0; and R=$C_xM_{2x+1}$ wherein x is an integer from 1 to 6;

C) the accelerant being an onium-organic compound having a positive charge in amount from 0.05 to 5 phr, preferably from 0.5 to 2.

The (per)fluoropolyoxyether P linking group comprises repeating units statistically distributed along the polymer selected from:
—($CF_2CF_2O$)—, —(CFYO)— wherein Y is equal to F or —$CF_3$, —($C_3F_6O$)—, —($CF_2(CF_2)_{z'}O$)— wherein z' is an integer equal to 2 or 3, —($CF_2CF(OR_f)O$)—, —(CF($OR_f$)O)— wherein $R_f$ is equal to —$CF_3$, —$C_2F_5$, —$C_3F_7$; —$CR'_4R'_5CF_2CF_2O$— wherein $R'_4$ and $R'_5$ are equal to or different from each other and selected from H, Cl or perfluroalkyl, for instance with 1–4 C atoms.

The number average molecular weight of the (per)fluoroether P is comprised between 300 and 1500, preferably 300 to 600.

Specifically preferred (per)fluoropolyether P are:

  (a)

wherein Y is F or —CF$_3$; a' and b' are integers such that the molecular weight is comprised in the above range; a'/b' is comprised between 10 and 100;

or the repeating units indicated in (a) can be linked as follows:

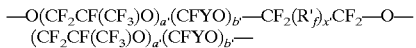

wherein R'$_f$ is a fluoroalkylene group, for instance from 1 to 4 C atoms;

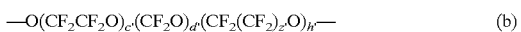  (b)

wherein c', d' and h' are integers such that the molecular weight is comprised in the indicated range; c'/d' is comprised between 0.1 and 10; h'/(c'+d') is comprised between 0 and 0.05, z' has the above value, h' can be also equal to 0;

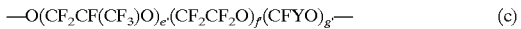  (c)

wherein Y is F or —CF$_3$; e', f', g' are integers such that the molecular weight is comprised in the mentioned range; e'/(f'+g') is comprised between 0.1 and 10, f'/g' is comprised between 2 and 10;

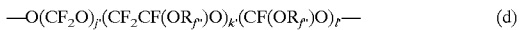  (d)

wherein: R$_{f''}$ is —CF$_3$, —C$_2$F$_5$, —C$_3$F$_7$; j',k',l' are integers such that the molecular weight is comprised in the indicated range; k'+l ' and j'+k'+l ' are at least equal to 2, k'/(j'+l ') is comprised between 0.01 and 1000, l'/j' is comprised between 0.01 and 100;

  (e)

wherein s' is an integer such as to give the indicated molecular weight, z' has the alreay defined meaning;

  (f)

wherein R'$_4$ and R'$_5$ are equal to or different from each other and selected from H, Cl or perfluoroalkyl, for instance having 1–4 C atoms, j" being an integer such that the molecular weight is that indicated; said unit in the fluoropolyoxyalkylene chain being linked to each other as follows:

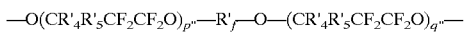

wherein R'$_f$ is a fluoroalkylene group, for instance from 1 to 4 C atoms, p" and q" are integers such that the molecular weight is that indicated;

  (g)

j''' being an integer such as to give the indicated molecular weight; said units being linked each other in the fluoropolyoxyalkylene chain as follows to give a bivalent radical:

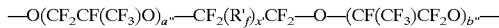

wherein R'$_f$ has the above meaning, x' is 0 or 1, a" and b" are integers and a"+b" is at least 1 and such that the molecualar weight is that indicated.

These structures comprising the mentioned repeating units and the methods for preparing them are described in GB 1,104,482, U.S. Pat. Nos. 3,242,218, 3,665,041, 3,715,378, 3,665,041, EP 148,482, U.S. Pat. Nos. 4,523,039, 5,144,092, and for the functional derivatives see U.S. Pat. No. 3,810,874. All these patents are incorporated herein by reference.

When the (per)fluoropolyether is monofunctional, a particular R meaning, has preferably the structure of (a) type, and the chain end group is selected from —CF$_3$, —C$_2$F$_5$, —C$_3$F$_7$, —CF$_2$H, —CFHCF$_3$, —CF$_2$CF$_2$H, ClCF$_2$CF(CF$_3$)—, CF$_3$CFClCF$_2$—, ClCF$_2$CF$_2$—, ClCF$_2$—.

Particularly preferred structures for P are those of (b) type.

The accelerant onium compound C) is generally selected from the following classes:

I) aminophosphonium [P(NR'R")$_{na}$(R$^1$ R$^2$ R$^3$)$_{4-na}$]$^+$ wherein "na" is an integer comprised between 1 and 3; R', R" and R$^1$ R$^2$ R$^3$, equal to or different from each other, are alkyl, cycloalkyl, aryl, arylalkyl, oxyalkyl or polyoxyalkyl groups having a free or esterified end —OH function;

R' and R" contain from 1 to 7 carbon atoms and can be linked to each other so as to form a heterocyclic ring with the nitrogen atom while R$^1$, R$^2$, R$^3$, equal to or different from each other, contain from 1 to 18 carbon atoms.

III) compounds having the formula

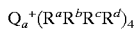

wherein Q$_a$ is selected from nitrogen, phosphorous, arsenic, antimony, preferably phosphorous, or

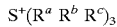

R$^a$, R$^b$, R$^c$, R$^d$ are selected from alkyls, aryls, alkylaryls or combinations thereof, two of said free radicals can be linked to each other and the Q or S atom can form a heterocyclic ring.

Preferred compounds are the quaternary ammonium and phosphonium compounds which contain at least a nitrogen and/or phosphorous atom linked with four covalent single bonds to four organic radicals generally containing from 1 to 30 carbon atoms, preferably from 2 to 8.

The organic radical being linear or branched can contain heteroatoms.

These compounds are described in U.S. Pat. No. 4,287,320. Preferred compounds are triphenylbenzylphosphonium, tetrabutylphosphonium, tetrabutylammonium.

The accelerant can be also a mixture of the compounds of the single classes I) or III), or of more compounds of the same class.

The accelerants are described in the art for instance in U.S. Pat. No. 4,259,463 for the amino-phosphonium compounds, in U.S. Pat. No. 3,712,877 for the quaternary phosphonium salts, in U.S. Pat. No. 3,655,727 for the quaternary ammonium salts.

The preferred accelerants are those deriving from ammonium and aminophosphonium salts wherein the phosphor atom is linked to a nitrogen atom and the other three covalent bonds are organic radicals wherein the carbon is linked to phosphor.

For instance the following cations of the accelerant can be mentioned:

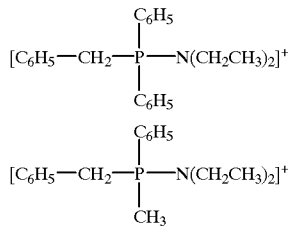

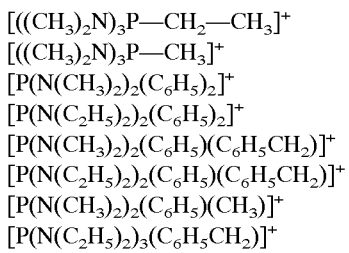

[((CH$_3$)$_2$N)$_3$P—CH$_2$—CH$_3$]$^+$
[((CH$_3$)$_2$N)$_3$P—CH$_3$]$^+$
[P(N(CH$_3$)$_2$)$_2$(C$_6$H$_5$)$_2$]$^+$
[P(N(C$_2$H$_5$)$_2$)$_2$(C$_6$H$_5$)$_2$]$^+$
[P(N(CH$_3$)$_2$)$_2$(C$_6$H$_5$)(C$_6$H$_5$CH$_2$)]$^+$
[P(N(C$_2$H$_5$)$_2$)$_2$(C$_6$H$_5$)(C$_6$H$_5$CH$_2$)]$^+$
[P(N(CH$_3$)$_2$)$_2$(C$_6$H$_5$)(CH$_3$)]$^+$
[P(N(C$_2$H$_5$)$_2$)$_3$(C$_6$H$_5$CH$_2$)]$^+$

The 1,1-diphenyl-1-benzyl-N-diethyl-phosphoranamine cation is particularly preferred.

Among the quaternary phosphonium compounds it can be mentioned:

(CH$_3$)$_2$(C$_2$H$_5$)$_2$P$^+$
(C$_2$H$_5$)$_3$C$_{18}$H$_{37}$P$^{30}$
(CycloC$_6$H$_{11}$)$_2$(C$_6$H$_{13}$)$_2$P$^+$
(C$_4$H$_9$)$_3$CH$_2$=CH—CH$_2$P$^+$
(C$_4$H$_9$)$_4$P$^+$
(C$_6$H$_5$)$_3$(C$_6$H$_5$CH$_2$)P$^+$
(C$_6$H$_5$)$_3$(CH$_3$OC$_2$H$_5$)P$^+$
(C$_8$H$_{17}$)$_3$[(CH$_3$)$_2$NCH$_2$CH$_2$CH$_2$]P$^+$
(C$_8$H$_{17}$)$_3$(HOC$_2$H$_4$)P$^+$
$^+$P(C$_2$H$_5$)$_3$CH$_2$CH$_2$CH$_2$CH$_2$(C$_2$H$_5$)$_3$P$^+$ The above compounds can be mentioned as ammonium compounds wherein there is nitrogen instead of phosphorous.

Tetrabutyl phosphonium and tetrabutyl ammonium are particularly preferred.

The anions are generally monovalent, but they can be also bivalent or polyvalent.

Typical anions are chlorine, bromine, the hydroxyle anion, bisphenol or polyhydroxyphenol anion, methoxy anion, acetate, mercaptate, sulphate, bisulphite and the like.

The process for preparing the crosslinking agents of the present invention is, for illustrative purpose, the following: the silanising agent is heated to 50°–100° C., then the compound Q, preferably bisphenol AF, is gradually added, preferably so as to have a controlled gas development. Then the temperature is rised to 120°–150° C. under stirring for about 1–4 hours, preferably 1–2 hours.

If instead of the silanising agent an unsaturated cyclic compound (n=1, t from 3 to 10) is used, the unsaturated cyclic compound is poured in a mixture containing the Q compound, preferably bisphenol AF, together with a Lewis acid, preferably ethereal BF$_3$, at a temperature in the range −20°/+50° C., preferably 0°/+10° C. The reaction course is followed by classic analytical techniques, for instance by thin layer chromatography or NMR. To obtain a pure product a flash chromatography is carried out on a silica gel.

The curing compound moreover contains
a) one or more inorganic acid acceptors selected from those known in the VDF based copolymer ionic curing, in amount 1–40 parts for 100 parts of the fluoroelastomeric copolymer;
b) one or more basic compounds selected from those known in the VDF based copolymer ionic curing, in amount 0.5–10 parts for 100 parts of fluoroelastomeric copolymer.

As it is also known, the basic compounds mentioned at point b) are commonly selected from the group formed by Ca(OH)$_2$, Sr(OH)$_2$, Ba(OH)$_2$, the metal salts of weak acids such as, for instance, Ca, Sr, Ba, Na and K carbonates, benzoates, oxalates and phosphites and mixtures of the above hydroxides with the above metal salts.

The composition according to the present invention commonly contains other known components, such as fillers (for instance, carbon black, silica and dyes), generally from 5 to 30 phr; and processing coadjuvants (for instance plasticizers), generally from 0.1 to 5 phr. See for instance U.S. Pat. Nos. 4,287,320, 3,712,877, 3,655,727, 4,259,463.

As said the fluoroelastomeric copolymers are vinylidene fluoride copolymers with one or more fluorinated monomers having an ethylene unsaturation.

Said comonomers are, for instance, C$_2$–C$_8$ fluoroolefins, such as tetrafluoroethylene (TFE), hexafluoropropene (HFP); C$_2$–C$_8$ chloro and/or bromo and/or iodo-fluoroolefins, such as chlorotrifluoroethylene (CTFE) and bromotrifluoroethylene; (per)fluoroalkylvinylethers (PAVE) of formula CF$_3$=CFOR$_f$, wherein R$_f$ is a C$_1$–C$_6$ (per) fluoroalky, for instance, (per)fluoro-oxyalkyl-vinylethers having the general formula CF$_2$=CFOX, wherein x is a C$_1$–C$_{12}$ (per)fluoro-oxyalky having one or more ether groups, for instance, perfluoro-2-propoxypropyl; non fluorinated C$_2$–C$_8$ olefins (Ol), preferably ethylene and propylene.

The preferred vinylethers are perfluoroalkylperfluorovinylethers, particularly the perfluoromethylperfluorovinylether and the perfluoropropylperfluorovinylether. The usable perfluorovinylethers and perfluoroalkoxyvinylethers are described in U.S. Pat. No. 3,291,843.

The fluoroelastomeric copolymers according to the present invention are prepared by monomer emulsion polymerization according to conventional techniques, preferably in presence of radical initiators such as for instance alkaline or ammonium persulphates, perphosphates, perborates or percarbonates, optionally combined with reducing agents such as alkaline metals or ammonium sulphites, bisulphites, hyposulphites, phosphites, hypophosphites or combined with ferrous, cuprous or silver salts, or other easily oxidizable metals.

These methods are described in Kirk Othmer, Encyclopaedia of Chemical Technology, vol. 8, pages 500 and sub., 1979. As polymerization methods, in particular, the bulk polymerization, the organic solvent solution plymerization and the water emulsion or suspension polymerization can be used.

Surfactants, such as for instance ammonium perfluorooctanoate or other known to be suitable in the preparation of fluoroelatomers can be present in the polymerization medium.

Chain transfer agents can generally be used as molecular weight regulators. Among them ethyl acetate, ethyl malonate, iodinated and/or brominated transfer agents, such as for instance the compounds of general formula Rf(I)$_x$(Br)$_y$ (Rf=perfluorinated hydrocarbon radical containing from 1 to 8 carbon atoms, x, y=integers comprised between 0 and 2, with at least x or y=1 and x+y<2) are for intance comprised. Alkaline or alkaline-earth metal iodides and/or bromides can also be used according to the European Patent Application 407,937.

When the polymerization is over, the fluoroelastomer is isolated from the polymeric latex by known methods, such as coagulation by addition of electrolytes or by cooling.

The polymerization reaction is generally carried out at temperatures comprised between 25° C. and 150° C., under pressure up to 10 MPa.

The elastomeric copolymers according to the invention are also prepared by polymerization in the presence of a microemulsion formed by one or more perfluoropolyoxyalkylenes and water, according to the method described in the European Patent Application 250,767.

The polymerization can be carried out also by using, instead of a microemulsion, an emulsion or a dispersion of perfluoropolyoxyalkylenes and water according to the method described in U.S. Pat. No. 4,789,717.

To this purpose also the emulsions and dispersions of perfluorooxyalkylenes and water described for instance in the European Patent Applications 196,904, 280,312 and 360,292 can be used.

For the curing of the polymers of the invention the elastomeric composition must be heated, under pressure, at a temperature in the range 130°–250° C., preferable 160°–210° C., for a time in the range 0.5–60 minutes and preferably 1–20 minutes. Successively the so obtained manufactured articles can be post-cured in stove or in oven, at atmospheric pressure, at a temperature in the range 130°–315° C., preferably 200°–275° C., for a time in the range 5–48 hours and preferably 10–24 hours.

The following examples are given for illustrative but not limitative purposes of the present invention.

EXAMPLE 1

(Synthesis of 4,4'-hexafluoroisopropylidene/ bistrimethylsilyldiphenol, BAFSE)

The BAFSE was synthetized with the method of the tildisilazane test, described in the art (Journal of Macromolecular Science, 1986, A (23)) for the silylation of bisphenol A.

One BF-AF mole is put in a feeder for solids which is fixed to a three necked flask; 2.5 moles of hexamethyldisilazane and a magnetic stirrer are put in the flask.

The flask is connected to a bubble condenser and is heated to 60° C. When the temperature is reached, BF-AF is added.

The addition is completed in 30 min. The $NH_3$ development is almost immediate and a limpid and homogeneous solution is formed. The $NH_3$ development ends after about 1 hour from the last addition of BF-AF. When the addition is over, the temperature is rised to 125°–130° C. (reflux temperature of hexamethyldisilazane) and the reaction mixture is left under stirring for about 2 hours, and the reaction course is followed by T.L.C. ($CH_2Cl_2$ as eluent).

When from the T.L.C. only the biprotected bisphenol (BAFSE) results to be present, the reaction is stopped and the excess or unreacted hexamethyldisilazane is distilled in a one necked flask dipped in an oil bath at 60° C., by applying a 50 mm Hg vacuum. A yellowish liquid is obtained which crystallizes as a white solid. The conversion based on the BF-AF introduced is total and the yield in BASFE silylated at both the hydroxylic functionalities is 98.5%. The monosilylated fraction is separated from the bi-silylated BASFE by a flash chromatography on silica gel by eluting with methylene chloride.

The 99.7% pure bi-silylated BASFE is obtained.

Conversion: 94%.

FT-IR: 3051 (CH aromatic st.); 2962 (CH aliphatic st. on Si); 1610 and 1514 (C=C aromatic st.); 1255 and 1179 (CF st.); 917 (Si—O—Ar st.), 846 ($Si(CH_3)_3$ st.); 740 (para sub.).

$^{19}$F-NMR: –63.1 ppm ($CF_3$); (BF-AF: –64.3).

$^1$H-NMR: 7.3 and 7.0 ppm doublet of doublets (H arom.); 0.3 ppm ($CH_3$ on Si) s.

EXAMPLES 2a AND 2b COMPARATIVE

Two standard formulations were prepared by using as elastomer the TECNOFLON N935® product (VDF 80% molar, HFP 20%), commercialized by Ausimont S.p.A.

In Example 2a the BISAF is used as curing system, while in Example 2b as crosslinking system an adduct (named XA51) between the BISAF and the diphenylphosphine-diethyl benzyl ammonium chloride in the 5-1 ratio is used.

The adduct was prepared according to the preparation of the adduct reported in EP 684,277.

The curing compositions are described in Table 1.

The curing data expressed as ODR at 160° C., 177° C. and 190° C. are reported in the same Table.

In Table 2 Mooney viscosity, mechanical property and compassion set values are reported.

EXAMPLE 3

TECNOFLON N935® elastomer of Examples 2a and 2b is formulated by using as crosslinking system the curing agent of Example 1 of the invention.

The curing composition is described in Table 1. The ODR data at 160° C., 177° C. and 190° C. are reported in the same Table.

It can be noted how with the crosslinking system of the invention, ML values (ODR minimum) always result lower than those of the comparative compositions. This shows the good plasticizing effect due to BASFE.

In Table 2 Mooney viscosity, mechanical property and the compession set values are reported.

The good plastifying effect of the crosslinking system of the invention is confirmed by the lower value of Mooney blend and minimum of Mooney scorch compared with that of the known crosslinking systems.

Moreover Table 2 shows an higher t15 value for the product of the invention which means a lower scorch and therefore a greater "safety" during the blend processing.

TABLE 1

| EXAMPLE | | 2a comp. | 2b comp. | 3 |
|---|---|---|---|---|
| Curing formulation composition | | | | |
| Polymer | | 100 | 100 | 100 |
| BAFSE | phr | — | — | 2.8 |
| BAF | phr | 2 | — | — |
| GM-102E* | phr | 0.45 | — | 0.45 |
| TECNOFLON ™ XA51** | phr | — | 2.4 | — |
| MgO DE | phr | 3 | 3 | 3 |
| Ca(OH)$_2$ | phr | 6 | 6 | 6 |
| Black MT | phr | 30 | 30 | 30 |

TABLE 1-continued

| EXAMPLE | | 2a comp. | 2b comp. | 3 |
|---|---|---|---|---|
| Formulation characteristics | | | | |
| ODR 160° C. ARC 3, 24' (ASTM D2084-81) | | | | |
| ML | (pounds*inch) | 22 | 22.5 | 19 |
| MH | (pounds*inch) | 121.3 | 125.6 | 120 |
| MH-ML | (pounds*inch) | 99.3 | 105.1 | 101 |
| TS2 | (sec.) | 174 | 180 | 198 |
| T'90 | (sec.) | 360 | 321 | 432 |
| Vmax | (pounds*inch/sec.) | 1.19 | 1.85 | 1.11 |
| ODR 177° C. ARC 3, 12' (ASTM D2084-81) | | | | |
| ML | (pounds*inch) | 17.7 | 18.4 | 15.8 |
| MH | (pounds*inch) | 120.3 | 120.7 | 116.4 |
| MH-ML | (pounds*inch) | 102.6 | 102.3 | 100.6 |
| TS2 | (sec.) | 99 | 96 | 93 |
| T'90 | (sec.) | 180 | 168 | 189 |
| Vmax | (pounds*inch/sec.) | 2.53 | 3.32 | 2.6 |
| ODR 190° C. ARC 3, 12' (ASTM D2084-81) | | | | |
| ML | (pounds*inch) | 18.4 | 18.2 | 15.5 |
| MH | (pounds*inch) | 119.1 | 120.5 | 112.5 |
| MH-ML | (pounds*inch) | 100.7 | 102.3 | 97 |
| TS2 | (sec.) | 66 | 66 | 72 |
| T'90 | (sec.) | 135 | 114 | 138 |
| Vmax | (pounds*inch/sec.) | 3.53 | 4.37 | 3.34 |

*GM-102E: diphenylphosphine-diethyl-benzylammoniumchloride
**TECNOFLON ™ XA51: adduct between BISAF and GM-102E in the 5:1 molar ratio

TABLE 2

| EXAMPLE | | 2a comp. | 2b comp. | 3 |
|---|---|---|---|---|
| Blend characteristics | | | | |
| Mooney Viscosity (ASTM D1646) | | | | |
| ML (1 + 10) 121° C. | | 98 | 93 | 88 |
| Mooney scorch 135° C. (ASTM D1646-82) | | | | |
| MV | | 45 | 42 | 40 |
| t15 | | 21' | 29' 30" | 33' |
| Mechanical properties after press (170° C. * 10') (ASTM D412-83) | | | | |
| M100 | (MPa) | 4.6 | 4.9 | 4.3 |
| C.R. | (MPa) | 10.3 | 10.8 | 9.1 |
| A.R. | (%) | 231 | 232 | 237 |
| ShA Hard. | (points) | 72 | 72 | 72 |
| Compression Set 200° C.*70 hours (ASTM D1414-78) | | | | |
| O-RING | (%) | 35 | 37 | 35 |
| Mechanical properties after post-curing at 250° C. for 24 hours (ASTM D412-83) | | | | |
| M100 | (MPa) | 7.4 | 6.7 | 6.9 |
| C.R. | (MPa) | 15.6 | 15.5 | 14.6 |
| A.R. | (%) | 177 | 185 | 183 |
| ShA Hard. | (points) | 73 | 74 | 73 |
| Compression Set 200° C.*70 hours (ASTM D1414-78) | | | | |
| O-RING | (%) | 14 | 15 | 14 |

EXAMPLE 4 COMPARATIVE

TECNOFLON T439® elstomer (terpolymer having an high fluorine content) (VDF 54%, HFP 23%, TFE 23% by moles) commercialized by Ausimont S.p.A., was formulated by using XA51 as crosslinking agent.

The curing composition is reported in Table 3.

The curing characteristics, ODR at 177° C. and 190° C. are reported in the same Table.

Mooney viscosity, mechanical property and the compression set values are reported in Table 4.

EXAMPLE 5

The terpolymer of Example 4 was crosslinked by using as crosslinking agent the compound of Example 1.

The curing composition is reported in Table 3.

The curing characteristics, the ODR at 177° C. and 190° C., are reported in the same Table.

Also in this case the better processability due to the use of the crosslinking agent of the invention in the curing blend is evident because of the lower value of the ODR minimum with respect to the comparative Example 4.

In Table 4 Mooney viscosity values are reported.

The high plasticizing effect of the BASFE can be noted in the very low Mooney blend value in comparison with the comparative Example 4.

Moreover the Mooney scorch confirms the good "safety" in the blend working, thanks to the high t15 value with respect to the comparative Example.

The mechanical properties values confirm the good crosslinking degree of the crosslinking system of the invention at the levels of the known system.

TABLE 3

| EXAMPLE | | 4 comp. | 5 |
|---|---|---|---|
| Curing formulation composition | | XA | |
| Polymer | | 100 | 100 |
| BAFSE | phr | — | 4.25 |
| GM-102E | phr | — | 0.7 |
| XA51 | phr | 3.65 | — |
| GM 200* | phr | 0.18 | 0.18 |
| MgO DE | phr | 3 | 3 |
| Ca(OH)$_2$ | phr | 6 | 6 |
| Black MT | phr | 30 | 30 |
| Formulation characteristics | | | |
| ODR 177° C. ARC 3, 12' (ASTM D2084-81) | | | |
| ML | (pounds*inch) | 9.8 | 8.7 |
| MH | (pounds*inch) | 96.4 | 85.7 |
| MH-ML | (pounds*inch) | 86.6 | 77 |
| TS2 | (sec.) | 213 | 222 |
| T'90 | (sec.) | 423 | 384 |
| Vmax | (pounds*inch/sec.) | 1.35 | 1 |
| ODR 190° C. ARC 3, 12' (ASTM D2084-81) | | | |
| ML | (pounds*inch) | 8.6 | 7.3 |
| MH | (pounds*inch) | 94 | 86.1 |
| MH-ML | (pounds*inch) | 85.4 | 78.8 |
| TS2 | (sec.) | 135 | 141 |
| T'90 | (sec.) | 213 | 225 |
| Vmax | (pounds*inch/sec.) | 2.41 | 1.84 |

*GM 200 = Triphenyl benzylphosphoniumchloride

TABLE 4

| EXAMPLE | | 4 comp. | 5 |
|---|---|---|---|
| Blend characteristics | | | |
| Mooney viscosity (ASTM D1646) | | | |
| ML (1 + 10) 121° C. | | 86 | 68 |
| Mooney scorch 135° C. (ASTM D1646-82) | | | |
| MV | | 33' | 29' |
| t15 | | 52' 30" | 61' |
| Mechanical properties after press (170° C. * 10') (ASTM D412-83) | | | |
| M100 | (MPa) | 4.7 | 3.5 |
| C.R. | (MPa) | 9.6 | 7.5 |
| A.R. | (%) | 246 | 301 |
| ShA Hard. | (points) | 78 | 77 |
| Compression Set 200° C.*70 hours (ASTM D1414-78) | | | |
| O-RING | (%) | 55 | 59 |
| Mechanical properties after post-curing at 250° C. for 24 hours (ASTM D412-83) | | | |
| M100 | (MPa) | 6.9 | 6.1 |
| C.R. | (MPa) | 13 | 12.3 |
| A.R. | (%) | 165 | 187 |
| ShA Hard. | (points) | 79 | 81 |
| Compression Set 200° C.*70 hours (ASTM D1414-78) | | | |
| O-RING | (%) | 29 | 32 |

Invention results as shown from the Examples are much more surprising if it is considered that the blend Mooney viscosity is also lower than curing systems as described in EP 684,272 and EP 684,276.

What is claimed is:

1. Curable fluoroelastomeric compositions comprising:
A) 100 phr of fluoroelastomeric copolymers based on vinylidenefluoride (VDF) copolymers and at least a partially or completely fluorinated comonomer having an ethylene unsaturation;
B) 0.5 to 10 phr of a curing agent having the general formula

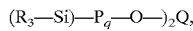
$(R_3-Si)-P_q-O-)_2Q$, wherein
q is 0 or 1,
R is selected from the group consisting of:
$C_xM_{2x+1}$ linear or branched aliphatic chain containing hydrogen and/or fluorine (M=H and/or F);
a $C_xM_{2x-1}$ cycloaliphatic structure containing hydrogen and/or fluorine;
a $C_xM_{x-1}$ aromatic structure containing hydrogen or fluorine;
x in said formulas is an integer from 1 to 20; and $P_a$ wherein P is a bivalent (per)fluoropolyether linking group and a is an integer from 0 to 1;
Q is selected from the group consisting of an aromatic or an aliphatic structure;
an aromatic structure containing nitrogen or oxygen; and
a structure having the following formula:

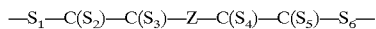
$-S_1-C(S_2)-C(S_3)-Z-C(S_4)-C(S_5)-S_6-$
wherein
$S_1, S_2, S_3, S_4, S_5$ and $S_6$ are equal to or different from each other, and are H or $C_1-C_5$ alkyls;

Z is a $C_1-C_{18}$ alkylene or cycloalkylene radical, linear or branched, optionally containing oxygen and/or fluorine atoms, or a bivalent (per) fluoropolyoxyalkylene radical P; and
C) an accelerant comprising an onium-organic compound having a positive charge.

2. Curable composition according to claim 1, wherein in the component (B) q=0, R is $C_xM_{2x+1}$, x is an integer from 1–6; or q=1, R is $C_xM_{2x+1}$, x is an integer from 1–6.

3. Curable compositions according to claim 1, wherein the (per)fluoropolyoxether P linking group comprises repeating units statistically distributed along the polymer chain selected from the group consisting of:
$-(CF_2CF_2O)-$, $-(CFYO)-$ wherein Y is equal to F or $-CF_3$, $-(C_3F_6O)-$, $-(CF_2(CF_2)_{z'}O)-$ wherein z' is an integer equal to 2 or 3, $-(CF_2CF(OR_f)O)-$, $-(CF(OR_f)O)-$ wherein $R_f$ is equal to $-CF_3$, $-C_2F_5$, $-C_3F_7$; and $-CR'_4R'_5CF_2CF_2O-$ wherein $R'_4$ and $R'_5$ are equal to or different from each other and are selected from the group consisting of H, Cl and perfluoroalkyl.

4. Curable compositions according to claim 3 wherein the part P has number average molecular weight between 300 and 1500.

5. Curable compositions according to claim 3 wherein P is selected from the group consisting of:

$-O(CF_2CF(CF_3)O)_{a'}(CFYO)_{b'}-$      (a)

wherein Y is F or $-CF_3$; a' and b' are integers such that the molecular weight is between 300 and 1500 and; a'/b' is between 10 to 100;
or the repeating units indicated in (a) can be linked as follows:

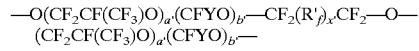
$-O(CF_2CF(CF_3)O)_{a'}(CFYO)_{b'}-CF_2(R'_f)_xCF_2-O-$
$(CF_2CF(CF_3)O)_{a'}(CFYO)_{b'}-$ wherein $R'_f$ is a fluoroalkylene group,

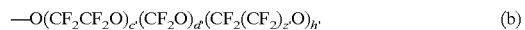
$-O(CF_2CF_2O)_{c'}(CF_2O)_{d'}(CF_2(CF_2)_{z'}O)_{h'}-$      (b)

wherein c', d' and h' are integers such that the molecular weight is between 300 and 1500 and c'/d' is between 0.1 and 10;
h'/(c'+d') is between 0 and 0.05, z' has the above value;

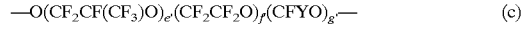
$-O(CF_2CF(CF_3)O)_{e'}(CF_2CF_2O)_{f'}(CFYO)_{g'}-$      (c)

wherein Y is F or $-CF_3$; e', f', g' are integers such that the molecular weight is between 300 and 1500 and e'/(f'+ g') is between 0.1 and 10, f'/g' is between 2 and 10;

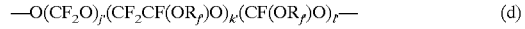
$-O(CF_2O)_{j'}(CF_2CF(OR_f)O)_{k'}(CF(OR_f)O)_{l'}-$      (d)

wherein: $R_f$ is $-CF_3$, $C_2F_5$, $-C_3F_7$; j', k', l' are integers such that the molecular weight is between 300 and 1500 and k'+l' and j'+k'+l' are at least equal to 2, k'/(j'+l') is between 0.01 and 1000, l'/j' is between 0.01 and 100;

$-O(CF_2(CF_2)_{z'}O)_{s'}-$      (e)

wherein s' is an integer such that the molecular weight is between 300 and 1500, is an integer equal to 2 or 3;

$-O(CR'_4R'_5CF_2CF_2O)_{j''}-$      (f)

wherein R'$_4$ and R'$_5$ are equal to or different from each other and selected from the group consisting of H, Cl and perfluoroalkyl, j" being an integer such that the molecular weight is between 300 and 1500; said unit in the fluoropolyoxyalkylene chain being linked to each other as follows:

—O(CR'$_4$R'$_5$CF$_2$CF$_2$O)$_{p''}$—R'$_f$—O—(CR'$_4$R'$_5$CF$_2$CF$_2$O)$_{q''}$— wherein R'$_f$ is a fluoroalkylene group, p" and q" are integers such that the molecular weight is between 300 and 1500;

—O(CF(CF$_3$)CF$_2$O)$_{j'''}$—     (g)

j''' being an integer such that the molecular weight is between 300 and 1500; said units being linked to each other in the fluoropolyoxyalkylene chain as follows to give a bivalent radical:

—O(CF$_2$CF(CF$_3$)O)$_{a''}$—CF$_2$(R'$_f$)$_x$CF$_2$—O—(CF(CF$_3$)CF$_2$O)$_{b''}$— wherein R'$_f$ has the above meaning, x' is 0 or 1, a" and b" are integers and a"+b" is at least 1 and such that the molecular weight is between 300 and 1500.

6. Curable compositions according to claim 5 wherein the monofunctional (per)fluoropolyether, has the structure of (a) type, and the chain end group is selected from the group consisting of —CF$_3$, —C$_2$F$_5$, —C$_3$F$_7$, —CF$_2$H, —CFHCF$_3$, —CF$_2$CF$_2$H, ClCF$_2$CF(CF$_3$)—, CF$_3$CFClCF$_2$—, ClCF$_2$CF$_2$—, ClCF$_2$—; p is of (b) type.

7. Curable compositions according to claim 1 wherein the accelerant onium compound C) is selected from the group consisting of:

I) aminophosphonium (P(NR'R")$_{na}$(R$^1$R$^2$R$^3$)$_{4-na}$)$^+$
  wherein "na" is an integer between 1 and 3; R', R" and R$^1$, R$^2$, R$^3$, equal to or different from each other, are selected from the group consisting of alkyl, cycloalkyl, aryl, arylalkyl, oxyalkyl or polyoxyalkyl groups having a free or esterified end —OH function; R' and R" contain from 1 to 7 carbon atoms and can be linked to each other so as to form a heterocyclic ring with the nitrogen atom while R$^1$, R$^2$, R$^3$, equal to or different from each other, contain from 1 to 18 carbon atoms;

II) compounds having the formula

Q$_a{}^+$(R$^a$R$^b$R$^c$R$^d$)$_4$ wherein Q$_a$ is selected from the group consisting of nitrogen, phosphorous, arsenic, antimony, and S$^+$(R$^a$R$^b$R$^c$)$_3$ R$^a$, R$^b$, R$^c$, R$^d$ are selected from the group consisting of alkyls, aryls, alkylaryls or combinations thereof, two of said free radicals can be linked to each other and the Q or S atom can form a heterocyclic ring.

8. Curable compositions according to claim 7 wherein the compound C) is selected from quaternary ammonium and phosphonium compounds which contain a nitrogen and/or phosphorous atom linked with four covalent single bonds to four organic radicals containing from 1 to 30 carbon atoms, the organic radical being linear or branched can contain heteroatoms.

9. Curable compositions according to claim 7 wherein the compound C) is selected from the group consisting of triphenylbenzylphosphonium, tetrabutylphosphonium, tetrabutylammonium and, 1,1-diphenyl-1-benzyl-N-diethyl-phosphoranamine salts.

10. Curable compositions according to claim 1 wherein the fluoroelastomers are selected from the group consisting of vinylidene fluoride copolymers with one or more fluorinated monomers having an ethylene unsaturation.

11. Curable compositions according to claim 10 wherein the comonomers are selected from the group consisting of C$_2$–C$_8$ fluoroolefins; C$_2$–C$_8$ chloro- and/or bromo- and/or iodo-fluoroolefins; (per)fluoroalkylvinylethers (PAVE) of formula CF$_2$=CFOR$_f$, wherein R$_f$ is a C$_1$–C$_6$ (per)fluoroalkyl; (per)fluorooxyalkylvinylethers having the general formula CF$_2$=CFOX, wherein X is a C$_1$–C$_{12}$ (per)fluorooxyalkyl having one or more ether groups; and non fluorinated C$_2$–C$_8$ olefins.

12. Cured fluoroelastomeric compositions obtained from the curable fluoroelastomeric compositions according to claim 1 by curing.

13. Curable compositions according to claim 1 herein Q is bisphenol.

* * * * *